Jan. 22, 1963     E. P. BULLARD III     3,074,295

TRANSMISSION

Filed May 4, 1960     3 Sheets-Sheet 1

INVENTOR.
EDWARD P. BULLARD III
BY
Paul N. Grit.
ATTORNEY

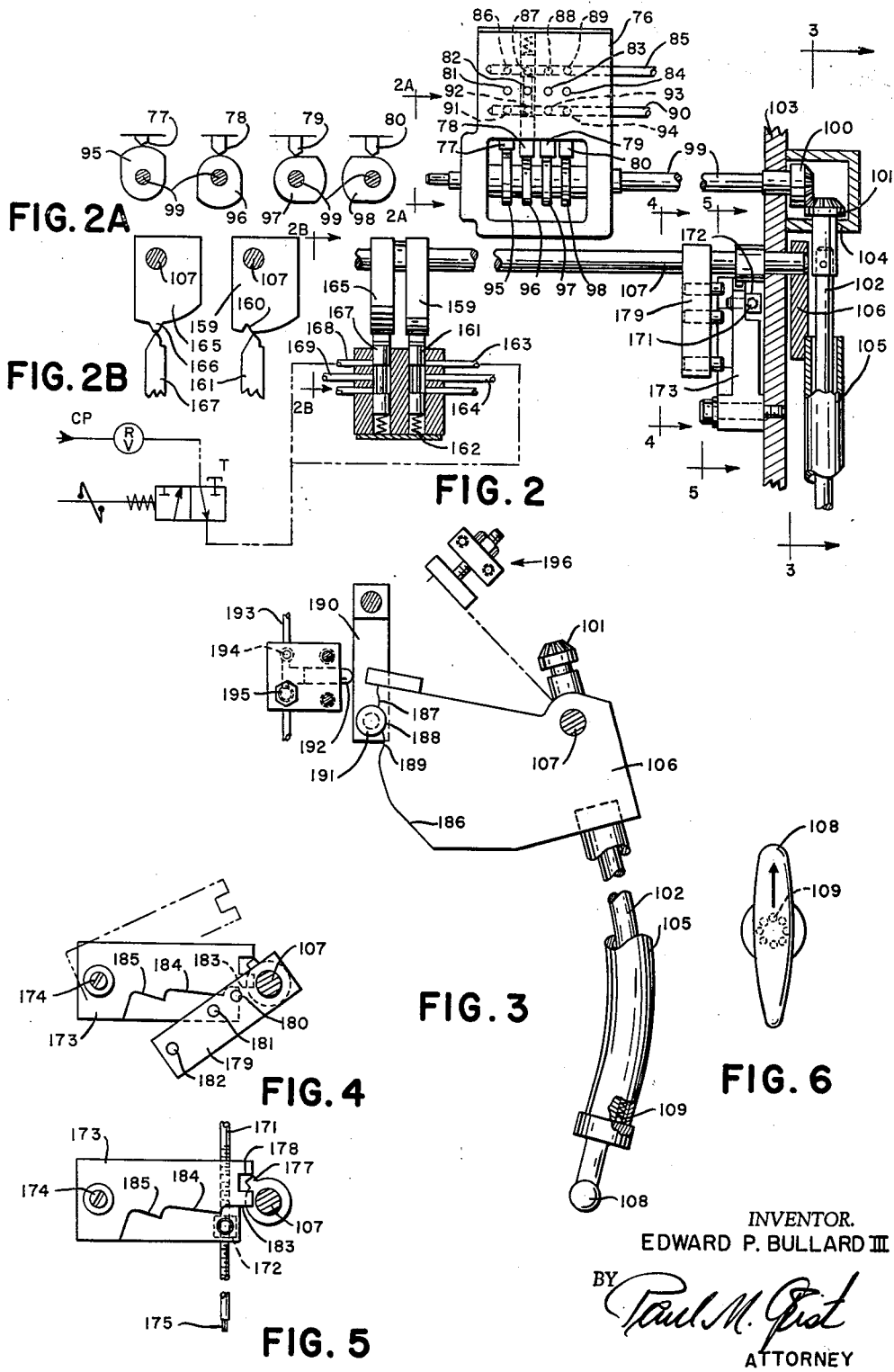

INVENTOR.
EDWARD P. BULLARD III
ATTORNEY

United States Patent Office 3,074,295
Patented Jan. 22, 1963

3,074,295
TRANSMISSION
Edward P. Bullard III, Fairfield, Conn., assignor to The Bullard Company, a corporation of Connecticut
Filed May 4, 1960, Ser. No. 26,783
19 Claims. (Cl. 74—687)

The present invention relates to variable speed transmissions, and particularly to a new and improved feedworks transmission for machine tools, and to a control therefor. This application relates to application Serial No. 775,307, filed November 20, 1958, in the name of Edward P. Bullard III, now Patent No. 2,972,907.

Heretofore, the common form of feedworks for a machine tool usually employed a plurality of feed speeds that were rendered effective through separate gearing combinations so that the power passing through the feedworks remained substantially constant for each of the plurality of feed rates. The power supplied to such feedworks usually is derived from a variable speed headstock transmission, the main function of which is to rotate a spindle to which work can be attached. In this way, the rate of feed is always related to the spindle speed and the feed rate is usually measured in fractions of inches per revolution of the spindle.

Many attempts have been made to provide steplessly variable feed rates for a movable machine tool member, but all have left much to be desired. Usually such attempts have included the use of a steplessly variable hydraulic system including a variable volume unit driving a constant displacement unit. Such systems produce constant torque output, and the range of low output speeds of the system occurs at the low speed range of the variable displacement unit. Both of these conditions adversely affect the low range of feeds of the movable member of the machine tool. The constant torque of such a system provides inadequate power throughout the range of operation of the system, and the low speed range of the variable displacement unit at low feed rates of the movable member is practically impossible to control accurately.

Furthermore, the use of such a hydraulic system is limited in that only one direction of rotation of the variable displacement unit can be employed. Consequently, to cover the entire range of feed and traverse rates of movement of the movable member of the machine tool, the variable displacement unit must operate at an uncontrollably slow rate of speed at the low feed rates where extreme accuracy is needed.

The principal object of this invention is to provide a plurality of variable speed transmissions that can be set to provide a predetermined ratio of rates of operation, and a control therefor that will maintain said ratio consant for any given adjustment of one transmission regardless of adjustments of another.

Another object of this invention is to provide a feedworks transmission in which separate and independently effective paths of power flow are employed, but arranged so that during the effectiveness of one, the other is conditioned preparatory to becoming effective.

Another object of this invention is to provide such a feedworks transmission in which epicyclic gearing arrangements are provided in plural paths of power flow.

Another object of this invention is to provide such a feedworks transmission in which the epicyclic gearing arrangements are acted upon by an auxiliary variable speed device and in which ratio means is provided between the epicyclic gearing arrangements and the output shaft for causing the output shaft to rotate at the same speed hrough either epicyclic gearing arrangement at a point within the range of speed adjustment of the auxiliary variable speed device.

Another object of this invention is to provide a feedworks transmission that is capable of steplessly varying the feed and traverse rates of movement of a machine tool member from zero to any desired rate within the limits of the design.

Another object of this invention is to provide such a feedworks transmission capable of accurately controlling the feed rate in slow feeds.

Another object of this invention is to provide such a transmission capable of providing substantially constant horsepower throughout its range of steplessly variable feed and traverse rates.

Another object of this invention is to provide a steplessly variable feedworks transmission including hydromechanical components, and wherein the low feed rates of the machine tool member occur when the hydraulic components are rotating within a speed range providing maximum efficiency of the units.

A further object of the invention is to provide such a feedsworks transmission capable of relating the feed rates thereof to the spindle speed of the machine tool so that accurate feeds per revolution of the spindle can be accomplished.

A still further object of the invention is to provide such a steplessly variable feedworks transmission in which the rapid traverse rates of movement of the machine tool member are unrelated to the speed of rotation of the machine tool spindle.

One aspect of this invention may be to provide a feedworks transmission having two paths of power flow between its input and output shaft and in which paths may be located separate epicyclic gearing arrangements having the usual three power transmitting elements. One of the elements of each arrangement may be driven from the power input shaft of the feedworks, and a second element of each arrangement may be driven by an adjustable auxiliary variable speed device. The auxiliary variable speed device may be of any type so long as it is capable of being adjusted in two directions within its range of speed variations. It may or may not be reversible; it may or may not be a stepless type of variable speed device; it may or may not be of a hydraulic type of steplessly variable speed device; and it may be driven by the input shaft or by any external source of power. However, under certain conditions, if the auxiliary variable speed device is driven by an external source of power, a loss of feedback power may be experienced during a portion of the range of operation of the transmission, which otherwise could be employed to advantage.

In another aspect of the invention, the auxiliary variable speed device may be connected to the epicyclic gearing arrangements in such a manner to cause a third element of one arrangement to increase in speed and a third element of the other arrangement to decrease in speed as the auxiliary variable speed device is operated in either of its directions of speed adjustment.

Ratio means may be provided between the output shaft and the third elements of the epicyclic arrangements which increase and decrease in speed as the auxiliary variable speed device is adjusted. In the embodiment disclosed, dissimilar ratio means are employed, and they may be such as to cause the output shaft to rotate at the same speed when one of the above-referred-to elements is rotating at a speed above the base speed of its arrangement and the other is rotating at a speed below the base speed of its arrangement.

Another aspect of the invention may be to provide means for transferring the flow of power to the output shaft from one of the third elements to the other third element when said third elements are, respectively, rotating above and below the base speed of their corresponding epicyclic arrangements, or when the auxiliary variable speed device is at one limit of its speed adjustment.

In another aspect of the invention, a control may be provided for the feedworks transmission which may be capable of selecting the direction and path of movement of the movable member of the machine tool as well as the rate of feed or traverse movement thereof, and which will, during any feed selection, definitely relate the feed to the rotation of the machine tool spindle. This control may include means for varying the displacement of the one hydraulic unit. The operation of the means may be effected by connecting one element of an epicyclic gearing arrangement to it, a second element thereof to the output of the feedworks, and a third element thereof to the output of a manually adjustable auxiliary variable speed system which is driven by means that drives the machine tool spindle. The construction may be such that upon manually setting, to a predetermined value, the variable speed system that is driven by the spindle drive, a differential speed will occur between its output and that of the feedworks, whereupon the one element of the last described epicyclic gearing arrangement will respond to this differential speed and adjust the variable displacement hydraulic unit to cause the feedworks to change its output speed so as to bring the second and third elements of the control epicyclic gearing arrangement into proper relation corresponding to the newly set condition of the spindle drive variable speed system.

In another aspect of the invention, a servomechanism may be provided in combination with a rack mechanism forming part of the control, and which may be operated independently of the spindle drive auxiliary variable speed system during rapid traverse movement of the machine tool member. This may be accomplished by disengaging a clutch between the control and the control epicyclic gearing arrangement when traverse speed of movement of the machine tool member is desired.

In still another aspect of the invention, a single oscillatable control lever may be provided for controlling the direction of motion of a tool head to which the feedworks transmission is connected in either feed or traverse. This single control lever may have a neutral position and a feed position on one side of the neutral position. It may have a range of positions on the opposite side of the neutral position that cover an infinitely variable traverse range of speeds from zero. In this way, a "creep" speed may be provided at the low end of the range of traverse speeds.

The above, other objects and novel features of the invention will become apparent from the following specification and accompanying drawings which are merely exemplary.

In the drawings:

FIG. 2 is a sectional schematic view of certain of the components forming the control for the apparatus shown in FIG. 1;

FIG. 2A is a view of the cams on shaft 99 of FIG. 2 in another plane;

FIG. 2B is a view of the cams on shaft 107 of FIG. 2 in another plane;

FIG. 3 is a view taken substantially along line 3—3 of FIG. 2, but rotated through 90°;

FIG. 4 is a view taken substantially along line 4—4 of FIG. 2;

FIG. 5 is a view taken substantially along line 5—5 of FIG. 2;

FIG. 6 is an end view of the control lever of FIG. 3; and

Figure 1:
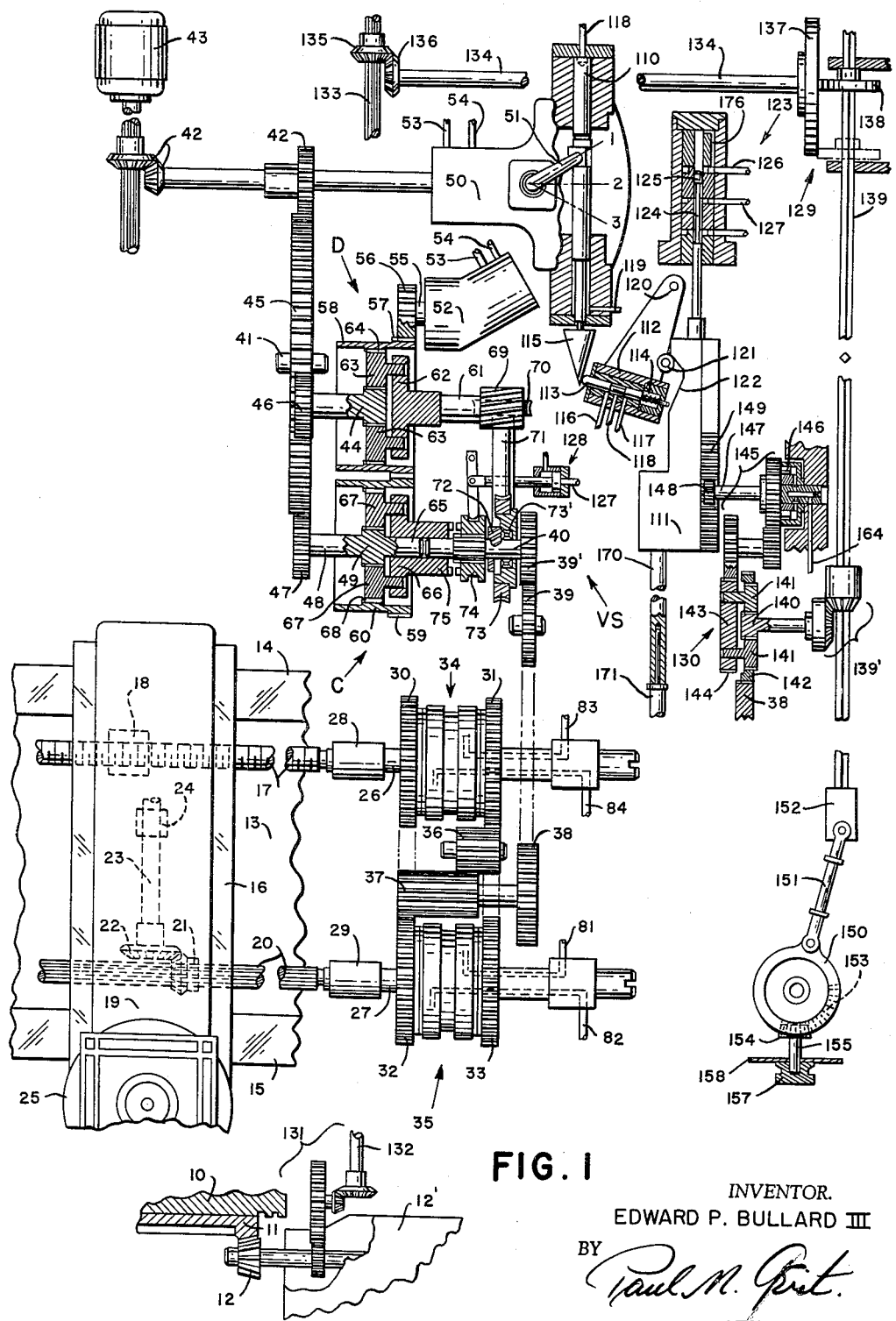
FIG. 1 is a front elevational view of a portion of a machine tool to which a schematic showing of the principles of the invention are applied.
Figure 7:
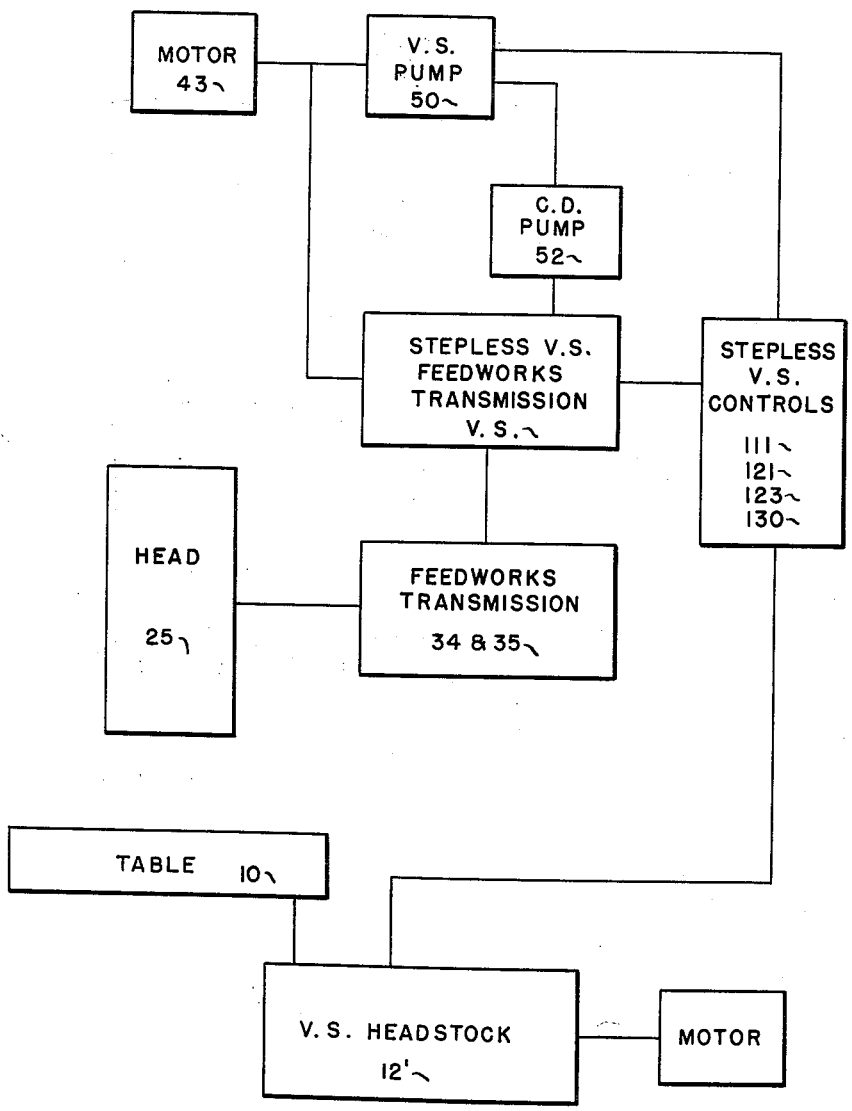
FIG. 7 is a block diagram of the various components shown in FIGS. 1 to 6.

Referring to FIG. 1, the principles of the invention are shown as applied to a lathe, in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12' which per se forms no part of this invention. This variable speed means may be of the conventional gear shifting type or otherwise. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored-out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with it slide 19 along ways 14, 15 of cross rail 13. And, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each, 30, 31, 32 and 33, for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relatively to gear 30, 31, 32 and 33 that gears 30 and 32 mesh with gear 37, while gears 31 and 33 may mesh with gear 36. Gears 30 and 33 are are shown in a stretch-out, unmeshing position for clarity. From the foregoing it is evident that the rotation of gear 37 will cause gears 30 and 32 to rotate in the same direction, and by virtue of gear 36, will cause gears 31 and 33 to also rotate in the same direction but reversely relatively to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through gears 38 and 39, the latter of which may be connected to a gear 39' fixed to the output shaft 40 of a variable speed transmission VS.

Referring to FIG. 1, an input shaft 41 having a gear 45 fixed thereto may be connected by suitable means such as gearing 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The motor 43 is also connected directly to a positive displacement variable volume hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement D. Gear 57 may mesh with a gear 59 on a second element 60 of the epicyclic gearing arrangement C.

From the foregoing it is evident that the hydraulic units 50 and 52 comprise a variable speed device that is connected to a second element of each of the epicyclic arrangements D and C. While a hydraulic steplessly variable speed device driven from the motor 43 has been disclosed, it is to be understood that the variable speed device need not be of the stepless variety, of the hydraulic type, nor be driven by the motor 43. It may comprise any form of variable speed device that can be adjusted in two directions throughout its range of speed variation. It may be driven by an external source of power, although when so driven, under certain circumstances a loss of feedback power is experienced which latter can be utilized to advantage to a certain degree and under certain conditions of operation when the variable speed device is driven from the input shaft 41.

The second elements 58 and 60 of the arrangements C and D are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 58 of the arrangement D.

The third element of the C arrangement may comprise a shaft 65 similar to shaft 61 and having an arm 66 journaling planet gears 67 that mesh with the sun gear 49 and the internal gear teeth 68 on the second element 60.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 mounted on shaft 40 with an overriding clutch 73′ therebetween for a purpose to be described later. A clutch element 74 may be splined to shaft 40 and it may cooperate with clutch engaging means on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 60 rotates oppositely to its sun gear 44 when lever 51 is in its number 1 position, if the proper gear ratios and the proper speed of shaft 55 are employed, shaft 61 can be standing still when reactor 60 is rotating at the proper speed incident to lever 51 being in its number 1 position.

With clutch 74 in the position shown in FIG. 1, and moving lever 51 toward its number 2 position, the speed of shaft 40 will increase, through the action of overriding clutch 73′, steplessly from zero to a speed coincident with the lever 51 arriving at its number 2 position where reactor 58 is stopped and shaft 61 is rotating at the base speed of the arrangement D. Continued movement of lever 51 toward its number 3 position causes reactor 58 to increase in speed from zero, but in a direction reversely to that in which it was rotating during the period when lever 51 was moved from its number 1 to its number 2 position. Expressed differently, reactor 58 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 60 is rotating in a direction opposite to its sun gear 49 and at a maximum speed so that shaft 65 is rotating at a speed below the base speed of the epicyclic gearing arrangement C. By employing the proper gear ratio between shaft 61 and shaft 40, the speed of shaft 65 can be slightly greater than the speed of shaft 40 when lever 51 is in its number 3 position so that clutch 74 can be shifted into engagement with clutch element 75 without tooth-on-tooth engagement, the overriding clutch permitting shaft 40 to be rotated at the slightly greater speed of shaft 65.

Movement of lever 51 from its number 3 position to its number 2 position causes reactor 60 to decrease in speed to a stopped condition and consequently causes a stepless increase in speed of shaft 65 and shaft 40. Movement of lever 51 to its number 1 position, of course, reverses the rotation of reactor 60 causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 position to its number 3 position and with clutch 74 in neutral, the speed of shaft 40 can be steplessly varied over a relatively small range of speeds, i.e., speeds from 0 to about 23 r.p.m. And, during movement of lever 51 from its number 3 to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

In order to operate the feedworks transmission to cause movement of the tool support in either direction along either of its paths of motion and at any predetermined feed or traverse speed, a control for the feedworks is provided. Referring to FIG. 2, the control may include a valve body 76 having four reciprocable valve spools 77, 78, 79 and 80, therein. The valve body may include four ports 81, 82, 83 and 84 that lead to the clutches 34 and 35 (FIG. 1). A common inlet line 85 may have four ports 86, 87, 88 and 89 in line, respectively, with ports 81 to 84, inclusive. A common exhaust line 90 may have four ports 91, 92, 93 and 94 in line, respectively, with ports 81 to 84, inclusive. Each spool 77, 78, 79 and 80 may be spring-urged downwardly onto separate cams 95, 96, 97 and 98 on a cam shaft 99. With the spools in their lower positions, the ports 81 to 84, inclusive, are connected to the exhaust line 90, and when any of said spools is in its upper position, its corresponding port 81 to 84 is connected to the pressure inlet line 85. Movement of the spools is, of course, effected by the oscillation of the cam shaft 99. It may have fixed to its one end a bevel gear 100 that meshes with a bevel gear 101 fixed to one end of a flexible shaft 102. The bevel gears 100 and 101 are journaled in bearings within fixed walls 103 and 104. The flexible shaft 102 may extend through a tubular arm 105 that is provided with a support 106. The support 106 may be fixed to a cam shaft 107 parallel with cam shaft 99.

The end of the flexible cable 102 opposite that connected to the bevel gear 101 may be connected to a hand grip 108 that is journaled in the end of arm 105 opposite that supporting plate 106. A spring pressed detent 109 may be provided for maintaining hand grip 108 in any rotary position to which it is moved. From the foregoing it is evident that turning of hand grip 108 turns cam shaft 99 and consequently actuates spools 77 to 80. Furthermore, it will be apparent that with the hand grip in the position shown in FIG. 3 and FIG. 6, spool 77 is raised providing communication from line 85, through port 81 to clutch 35 (FIG. 1), rendering gear 33 effective upon the admission of pressure fluid in line 85 as will be explained later. Each successive movement of hand grip 108 through 90° from the position shown in FIG. 6 in a clockwise direction will successively raise spools 79, 78 and 80, thereby rendering gears 31, 32 and 30 effective. Additionally, each 45° movement of hand grip 108 in a clockwise direction from any of the 90° positions will cause two of the spools to raise, thereby causing the movement of the tool support 25 along 45° paths. Thus, turning hand grip 108 clockwise 45° from the position shown in FIG. 6 will cause spools 77 and 79 to be raised, thereby rendering effective gears 33 and 31 (FIG. 1) upon the admission of pressure fluid to line 85.

Referring to FIG. 1, in order to control the flow of power through the variable speed transmission VS, means may be provided for moving the lever 51 between its various positions. In the embodiment disclosed, this means may comprise a reciprocable piston 110 that is connected to the lever 51. The movement of piston 110 may be effected by a servomechanism including a reciprocable cam 111 and a servo valve 112. The servo valve may include a spool 113 that is resiliently urged by a spring 114 into engagement with a cam 115 fixed to the one end of piston 110. Constant pressure and exhaust lines 116 and 117 are connected to the valve 112 such that the spool 113 blocks both when in its normal position or the position to which it returns after being displaced. Another line 118 is connected to valve 112 between the lines 116 and 117. Line 118 leads to the top of piston 110. A constant pressure line 119 continuously acts on piston 110 tending to return it to the position shown in FIG. 1; however, the area of piston 110 acted upon by pressure fluid from line 119 is less than that acted upon by pressure fluid from line 118 so that the latter overcomes the former when it is effective.

The valve 112 may be pivotally mounted at 120 and it may include a cam roller 121 that follows a cam surface 122 on cam 111. With the parts in the condition shown in FIG. 1, the lever 51 is in its number 1 position, and the units 50 and 52 are rotating at maximum speed in one direction. Movement of the cam 111 upwardly will cause the valve 112 to pivot counterclockwise about pivot 120 by the action of spring 114 expanding. This causes spool 113 to move leftwardly, establishing communication between lines 116 and 118 while maintaining exhaust line 117 closed. Accordingly, pressure liquid in line 118 forces piston 110 downwardly, moving arm 51 from its number 1 position toward its number 2 position until cam 115 forces spool 113 rightwardly to cut off communication between lines 116 and 118, at which point the pressure liquid within line 118 and above piston 110 is trapped, holding piston 110 and arm 51 in its new position.

As previously described, this causes the speed of the reactor 58 to decrease and that of the shaft 40 to increase causes the arm 51 to be moved downwardly through its from zero. Further upward movement of cam 111 number 2 position, thence to its number 3 position, at which point the follower roll 121 is at the low point of cam path 122 and the reactor 58 is rotating in a reverse direction at maximum speed. It is at this point that, due to the reduction gearing 69, 70, 72 and 73, shaft 40 has increased in speed from zero through its low speed range, and reactor 60 is conditioned to take over for the high speed range of operation of shaft 40. The arrangement is such that arm 66 is rotating at a speed slightly greater than that of shaft 40 so that clutch 74 can be shifted without tooth-on-tooth contact. Shifting of clutch 74 at the proper time is accomplished by a valve 123 having a valve stem 124 connected to the cam 111. When cam 111 is at a position in its upward travel such that the roll 121 is at the low point of cam surface 122, the head 125 of stem 124 establishes communication between lines 126 and 127, whereupon piston device 128 shifts clutch 74 into engagement with arm 75. Immediately, the faster rotating arm 75 takes over from the gear 73 because of the overriding clutch 73'.

Further upward movement of the cam 111 causes the roller 121 and valve 112 to move clockwise about pivot 120, thereby forcing spool 113 rightwardly, establishing communication between lines 118 and exhaust line 117, while still retaining line 116 blocked off. Accordingly, piston 110 begins to raise due to the pressure liquid in line 119 until cam 115 permits spool 113 to move leftwardly enough to close off exhaust line 117. This action of moving cam 111 upwardly may continue until arm 51 has returned to its number 1 position when shaft 40 is rotating at its maximum rate of speed.

Movement of the cam 111 downwardly from its uppermost position causes the shaft 40 to reduce in speed to zero when cam follower 121 is in the position shown in FIG. 1.

The reciprocation of the cam 111 during a metal removal operation of head 25 preferably should be related to the speed at which the table 10 is rotated by the conventional variable speed transmission 12'. During traverse movement of head 25, the movement of cam 111 should preferably be unrelated to the rotation of table 10. In the present embodiment, the function of relating head movement to table rotation has been accomplished by employing a servo drive 130 between the gear 38 and an auxiliary variable speed device 129 that is driven from the transmission 12' that drives the table 10. The servo drive 130 is in the form of an epicyclic gearing train.

The output shaft of the conventional variable speed transmission 12' drives a gear train 131 that in turn drives a shaft 132. The shaft 132 is connected to a shaft 133 that drives a shaft 134 through bevel gears 135 and 136. A flat disc 137 is fixed to shaft 134, and it frictionally drives a disc 138 that is fixed to a reciprocable shaft 139 having a square or splined cross section. With disc 138 in its solid line position at the center of disc 137, shaft 139 does not rotate. Movement of disc 138 toward its dot-and-dash position increases the speed of rotation of shaft 139 from zero to a maximum predetermined value.

The speed of rotation of shaft 139 is employed to drive, through bevel gearing 139′, a sun gear 140 of the epicyclic gearing arrangement 130. The sun gear 140 meshes with planet gears 141 which in turn mesh with the internal teeth of a ring gear 142. The external teeth of ring gear 142 mesh with gear 38 that is driven from the output shaft 40 of the variable speed unit VS. The planets 141 are journaled in an arm 143 that drives through gear teeth 144 thereon, a gear train 145 including a hydraulically operable clutch 146. When the clutch 146 is effective, gearing 145 drives a shaft 147 to which is fixed a pinion 148 in mesh with a rack 149 integral with the cam 111.

With the parts in the condition shown in FIG. 1, the shaft 38 is not rotating nor is shaft 139. Movement of disc 138 off its center position causes shaft 139 to rotate at a predetermined speed depending upon the distance that disc 138 is moved from center. Since gear 38 is not rotating, the rotation of sun gear 140 rotates arm 143 and hence shaft 147, provided, of course, that clutch 146 is effective. Rotation of shaft 147 may move cam 111 upwardly, thereby effecting the movement of lever 51 from its number 1 toward its number 2 position and hence starting the rotation of gear 38. When the speed of rotation of gear 38 arrives at a predetermined value, it will combine with the speed of rotation of the sun gear 140 and stop the rotation of arm 143. This, of course, stops the movement of cam 111 and also the movement of lever 51. By properly calibrating the offset positions of disc 138 with respect to the speeds of rotation of shaft 38, such positions can represent definite feed rates of movement of the head 25, each of which rates will be definitely related to the speed of rotation of the table 10.

Reciprocation of shaft 139 may be effected by connecting it to an oscillatable member 150 through a connecting rod 151 and a non-rotatable connector 152 that permits rotation of shaft 139. The member 150 may be provided with bevel gear teeth 153 that mesh with a bevel pinion 154 on a shaft 155 to which is fixed a knob 157 and a dial 158. The dial 158 may be marked to indicate the feed rates corresponding to the calibrated offset positions of disc 138.

From the foregoing it is evident that setting of dial 158 will cause head 25 to move at a predetermined feed rate related to the rotation of the table 10 when the clutch 146 is rendered effective.

Referring to FIGS. 2 and 3, arm 105 is adapted to be moved a short distance in a counterclockwise direction, thereby turning shaft 107 without turning shaft 99. The flexible cable 102 bends to accommodate this movement. A cam 159 on shaft 107 includes a notch 160 (FIG. 2B). When arm 105 is in its rightward position (FIG. 3), notch 160 permits a spool 161 to be moved upwardly by a spring 162, thereby permitting pressure fluid to flow from a line 163 through a line 164 to render effective clutch 146 (FIG. 1). Feeding motion of head 25 occurs along the path and in the direction represented by the position of handle 108, in one of its rotary positions which selectively activates one of the spools 77 to 80, inclusive. Another cam 165 on shaft 107 includes a rise 166 that cooperates with a spool 167 that is caused to raise when arm 105 is in its rightward "feed" position. This causes pressure fluid to flow from a line 168 through a line 169 to line 85, thereby rendering effective the selected clutch 34 or 35 to cause the head 25 to move in the selected direction at the selected feed rate.

As previously explained, movement of the head 25 at traverse rates of speed preferably should not be related to the rotation of the table 10. In the embodiment disclosed, this has been accomplished by providing a separate, mechanically operable actuator for moving cam 111 independently of the epicyclic control gearing 130. Referring to FIGS. 1, 4 and 5, a member 170 may be fixed to the cam 111 and it may make a telescopic connection with a rod 171. The rod 171 may be threadingly connected to a nut 172 which is pivotally mounted on a lever 173, which itself is pivotally mounted at 174. The threaded rod 171 may include a square end 175 to receive a wrench.

Referring again to FIG. 1, the constant pressure inlet 126 of valve 123 includes a pass 176 that causes the constant pressure liquid to act on the head 125 of the stem 124, constantly urging cam 111 and rod 171 downwardly. The cam shaft 107 may include a lug 177 which stops the downward movement of rod 171 when a point 178 on lever 173 engages it. The only time that point 178 engages lug 177 is when the arm 105 is in neutral. By adjusting the threaded rod 171 through the square end 175, a predetermined lower position of cam 111 can be provided for a purpose to be described later.

The cam shaft 107 may also include a lever 179 having three pins 180, 181 and 182 thereon. These pins are adapted respectively, to cooperate with cam surfaces 183, 184 and 185 formed on lever 173 as will be explained. Movement of the arm 105 in a clockwise direction (FIG. 3) for the first five degrees occurs before the pin 180 engages surface 183 on lever 173. This movement of arm 105 may be employed to provide a "creep" speed of the head 25 as preset by turning the threaded rod 171. At the neutral position of arm 105, the head 25 does not move because the spool 167 (FIG. 2B) is depressed, cutting off pressure fluid to lines 169 and 85. It is to be noted that a feed speed can be selected that is less than the preset "creep" speed since movement of the arm 105 rightwardly (FIG. 3) causes lug 177 (FIG. 5) to move counterclockwise away from the point 178, thereby permitting rod 171 to move downwardly if required for a feed rate that is less than the preset "creep" speed.

Movement of arm 105 in a clockwise direction (FIG. 3) after pin 180 engages surface 183 on lever 173, causes rod 171 and consequently cam 111 to move upwardly, thereby effecting the movement of arm 51 toward its number 2 position to increase the speed of gear 38 and hence the speed of movement of head 25. This movement of cam 111 is independent of the epicyclic gearing 130 since spool 161 (FIG. 2B) is depressed, exhausting clutch 146 (FIG. 1). Continued movement of arm 105 in a clockwise direction successively causes pins 181 and 182 to engage surfaces 184 and 185 on lever 173, thereby increasing the speed of head 25 to its maximum traverse rate.

In order to provide a degree of feel to the actuation of the arm 105, the support 106 may include a cam surface 186. It may include notches 187, 188 and 189 on its periphery. A pivoted lever 190 may include a roll 191 adapted to ride on the cam surface 186. A plunger 192 may be urged into engagement with lever 190 by a source of constant pressure liquid from a line 193, past a check valve 194. An adjustable needle valve 195 may be employed to exhaust the cylinder for pin 192 at a predetermined rate. The construction and arrangement of the parts are such that a definite resistance is felt when the arm 105 is in its "neutral," "feed" or "creep" positions. Furthermore, a controlled resistance to the increase in traverse speed of head 25 is felt by the controlled bleeding of the exhaust through the preset needle valve 195. An adjustable stop 196 may be provided for limiting the extent of clockwise movement of arm 105.

Although the various features of the transmission and control therefor have been shown and described in detail to fully disclose one embodiment of the invention, it will be evident that changes may be made in such details and certain features may be used without others without departing from the principles of the invention.

What is claimed is:

1. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said control transmission and the output of said steplessly variable speed transmission for moving the cam of said servomechanism; means adapted to preset said variable speed control transmission for causing said servomechanism to adjust said hydraulic transmission; an oscillatable arm having a neutral position; means rendered effective when said arm is on one side of its neutral position for causing said member to be moved at a rate depending upon the preset adjustment of said control transmission; means rendered effective when said arm is on the other side of its neutral position for causing said member to move at a rate depending upon the position of said arm and independent of said control transmission; a rotatable handle attached to said arm; and means rendered effective by the rotational positions said handle may assume for determining the path and direction of movement of said member.

2. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a reciprocable shaft for adjusting said hydraulic transmission; a cam; a servo valve between said cam and reciprocable shaft; a variable speed control transmission driven by said table-rotating transmission; an epicyclic gearing train connected to the output of said control transmission and to the output of said steplessly variable speed transmission for moving said cam; means adapted to preset said variable speed control transmission for causing said cam to operate said servo valve to thereby adjust said hydraulic transmission; an oscillatable arm having a neutral position; means rendered effective when said arm is on one side of its neutral position for causing said member to be moved at a rate depending upon the preset adjustment of said control transmission; means rendered effective when said arm is on the other side of its neutral position for causing said member to move at a rate depending upon the position of said arm and independent of said control transmission; a rotatable handle attached to said arm; and means rendered effective by the rotational positions said handle may assume for determining the path and direction of movement of said member.

3. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a reciprocable shaft for adjusting said hydraulic transmission; a cam; a pivotally mounted servo valve having a roller in contact with said cam and a valve stem in contact with the one end of said reciprocable shaft; a variable speed control transmission driven by said table-rotating transmission; an epicyclic gearing train connected to the output of said control transmission and to the output of said steplessly variable speed transmission for moving said cam; means adapted to preset said variable speed control transmission for causing said cam to operate said servo valve to thereby adjust said hydraulic transmission; an oscillatable arm having a neutral position; means rendered effective when said arm is on one side of its neutral position for causing said member to be moved at a rate depending upon the preset adjustment of said control transmission; means rendered effective when said arm is on the other side of its neutral position for causing said member to move at a rate depending upon the position of said arm and independent of said control transmission; a rotatable handle attached to said arm; and means rendered effective by the rotational positions said handle may assume for determining the path and direction of movement of said member.

4. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a first servomechanism for adjusting said hydraulic transmission, including a reciprocable cam; a variable speed control transmission driven by said table-rotating transmission; a separate servomechanism between the output of said control transmission and the output of said steplessly variable speed transmission for moving the cam of said first-mentioned servomechanism; means adapted to preset said variable speed control transmission for causing said first-mentioned servomechanism to adjust said hydraulic transmission; an oscillatable arm having a neutral position; means rendered effective when said arm is on one side of its neutral position for causing said member to be moved at a rate depending upon the preset adjustment of said control transmission; means rendered effective when said arm is on the other side of its neutral position for causing said member to move at a rate depending upon the position of said arm and independent of said control transmission; a rotatable handle attached to said arm and means rendered effective by the rotational positions said handle may assume for determining the path and direction of movement of said member.

5. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; an oscillatable arm having a neutral position; and means rendered effective when said arm is moved from its neutral position for moving said cam to actuate said servomechanism to thereby cause said member to be moved at a rate depending upon the position of said arm.

6. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; and means for increasing the resistance to the movement of said arm the farther it is moved from said neutral position.

7. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; a rotatable flexible shaft extending axially through said arm; a handle for said arm connected to the one end of said flexible shaft; and means rendered effective upon turning said handle to effect movement of said member along the path corresponding to the direction in which said handle is turned.

8. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; means for increasing the resistance to the movement of said arm the farther it is moved from said neutral position; a rotatable flexible shaft extending axially through said arm; a handle for said arm connected to the one end of said flexible shaft; and means rendered effective upon turning said handle to effect movement of said member along the path corresponding to the direction in which said handle is turned.

9. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said steplessly variable speed transmission and said variable speed control transmission for moving the cam of said servomechanism, said train including a clutch; means adapted to preset said variable speed control transmission for causing said servomechanism to adjust said hydraulic transmission; means normally urging said cam in one direction; an oscillatable arm having a neutral position; and means rendered effective when said arm is on one side of its neutral position for rendering said clutch effective to cause said member to be moved at a rate depending upon the preset adjustment of said control transmission.

10. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said steplessly variable speed transmission and said variable speed control transmission for moving the cam of said servomechanism, said train including a clutch; means adapted to preset said variable speed control transmission for causing said servomechanism to adjust said hydraulic transmission; means normally urging said cam in one direction; an oscillatable arm having a neutral position; means rendered effective when said arm is on one side of its neutral position for rendering said clutch effective to cause said member to be moved at a rate depending upon the preset adjustment of said control transmission; and means rendered effective when said arm is moved to the opposite side of its neutral position for moving said cam to actuate said servomechanism to thereby cause said member to be moved at a rate depending upon the position of said arm.

11. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said steplessly variable speed transmission and said variable speed control transmission for moving the cam of said servomechanism, said train including a clutch; means adapted to preset said variable speed control transmission for causing said servomechanism to adjust said hydraulic transmission; means normally urging said cam in one direction; an oscillatable arm having a neutral position; means rendered effective when said arm is on one side of its neutral position for rendering said clutch effective to cause said member to be moved at a rate depending upon the preset adjustment of said control transmission; means rendered effective when said arm is moved to the opposite side of its neutral position for moving said cam to actuate said servomechanism to thereby cause said member to be moved at a rate depending upon the position of said arm; a rotatable flexible shaft extending axially through said arm; a handle for said arm connected to the one end of said flexible shaft; and means rendered effective upon turning said handle to effect movement of said member along the path corresponding to the direction in which said handle is turned.

12. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enable the use of one arrangement to transmit a range of speeds to said reversely rotatable means while preconditioning the other arrangement for a different range of speeds; dissimilar ratio means between said arrangements and said reversely rotatable means; a servomechanism for adjusting said reversible variable speed means including a reciprocable cam; means normally urging said cam in one direction; an oscillatable arm having a neutral position; and means rendered effective when said arm is moved from its neutral position for moving said cam to actuate said servomechanism to thereby cause said member to be moved at a rate depending upon the position of said arm.

13. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enable the use of one arrangement to transmit a range of speed to said reversely rotatable means while preconditioning the other arrangement for a different range of speeds; dissimilar ratio means between said arrangements and said reversely rotatable means; a servomechanism for adjusting said reversible variable speed means including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; and means for increasing the resistance to the movement of said arm the farther it is moved from said neutral position.

14. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enable the use of one arrangement to transmit a range of speeds to said reversely rotatable means while preconditioning the other arrangement for a different range of speeds; dissimilar ratio means between said arrangements and said reversely rotatable means; a servomechanism for adjusting said reversible variable speed means including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; a rotatable flexible shaft extending axially through said arm; a handle for said arm connected to the one end of said flexible shaft; and means rendered effective upon turning said handle to effect movement of said member along the path corresponding to the direction in which said handle is turned.

15. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enable the use of one arrangement to transmit a range of speeds to said reversely rotatable means while preconditioning the other arrangement for a different range of speeds; dissimilar ratio means between said arrangements and said reversely rotatable means; a servomechanism for adjusting said reversible variable speed means including a reciprocable cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; means for increasing the resistance to the movement of said arm the farther it is moved from said neutral position; a rotatable flexible shaft extending axially through said arm; a handle for said arm connected to the one end of said flexible shaft; and means rendered effective upon turning said handle to effect movement of said member along the path corresponding to the direction in which said handle is turned.

16. Apparatus comprising in combination, a member; a variable speed means for moving said member along a path at varying rates of motion; another member; separate variable speed means for moving said other member along a path at varying rates of motion; a servomechanism including a cam for steplessly adjusting the variable speed means of one of said members to provide a predetermined ratio of movements of said members relatively to each other; an epicyclic gearing means having one member driven by said one variable speed means, another member driven by the other variable speed means, and a third member connected to said cam; means normally urging said cam in one direction; an oscillatable arm having a neutral position; and means rendered effective when said arm is moved from its neutral position for moving said cam to actuate said servomechanism to thereby cause said member to be moved at a rate depending upon the position of said arm.

17. Apparatus comprising in combination, a member; a variable speed means for moving said member along a path at varying rates of motion; another member; separate variable speed means for moving said other member along a path at varying rates of motion; a servomechanism including a cam for steplessly adjusting the variable speed means of one of said members to provide a predetermined ratio of movements of said members relatively to each other; an epicyclic gearing means having one member driven by said one variable speed means, another member driven by the other variable speed means, and a third member connected to said cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; and means for increasing the resistance to the movement of said arm the farther it is moved from said neutral position.

18. Apparatus comprising in combination, a member; a variable speed means for moving said member along a path at varying rates of motion; another member; separate variable speed means for moving said other member along a path at varying rates of motion; a servomechanism including a cam for steplessly adjusting the variable speed means of one of said members to provide a predetermined ratio of movements of said members relatively to each other; an epicyclic gearing means having one member driven by said one variable speed means, another member driven by the other variable speed means, and a third member connected to said cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; a rotatable flexible shaft extending axially through said arm; a handle for said arm connected to the one end of said flexible shaft; and means rendered effective upon turning said handle to effect movement of said member along the path corresponding to the direction in which said handle is turned.

19. In an apparatus including a member adapted to be moved in either direction along the intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; an oscillatable arm having a neutral position; a connection between said arm and said cam such that movement of said arm from its neutral position actuates said servomechanism to thereby cause said member to be moved at a rate depending upon the position of said arm; and means for adjusting the connection between said arm and said cam to thereby provide a creep speed of said member when said arm is adjacent its neutral position.

References Cited in the file of this patent
UNITED STATES PATENTS

| | | |
|---|---|---|
| 2,352,183 | Bullard | June 27, 1944 |
| 2,384,809 | Bullard | Sept. 18, 1945 |